No. 616,588. Patented Dec. 27, 1898.
S. A. ROBINSON.
FASTENER FOR END GATES.
(Application filed Oct. 21, 1898.)
(No Model.)

WITNESSES:
C. S. Frye
J. A. Walsh

INVENTOR
Stephen A. Robinson,
BY
Chester Bradford,
ATTORNEY

UNITED STATES PATENT OFFICE.

STEPHEN A. ROBINSON, OF LOGAN, KANSAS, ASSIGNOR OF ONE-HALF TO LEVI McCORMACK, OF INDIANAPOLIS, INDIANA.

FASTENER FOR END-GATES.

SPECIFICATION forming part of Letters Patent No. 616,588, dated December 27, 1898.

Application filed October 21, 1898. Serial No. 694,223. (No model.)

*To all whom it may concern:*

Be it known that I, STEPHEN A. ROBINSON, a citizen of the United States, residing at Logan, in the county of Phillips and State of Kansas, have invented certain new and useful Improvements in Fasteners for End-Gates, &c., of which the following is a specification.

The object of my said invention is to provide a means whereby especially the rods which hold the end-gates of wagon-bodies in place may be conveniently and expeditiously removed and replaced.

Said invention principally consists in a two-part separable nut, each part having a portion of its perforation screw-threaded and a portion with the screw-threads cut away and a rod also having a portion of the screw-threads cut away on two sides, the arrangement being such that when the parts are in a certain relation the rod can be pushed freely through the nut and when in another certain relation will be held firmly therein.

It further consists in certain details of construction and arrangement of parts, all as will be hereinafter more fully described and claimed.

Figure 1:
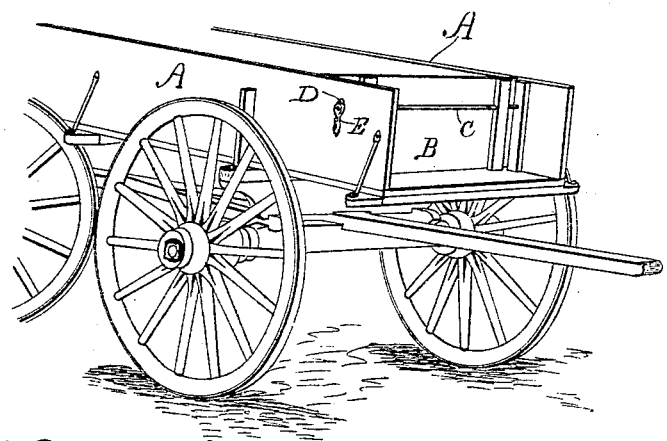
Figure 2:
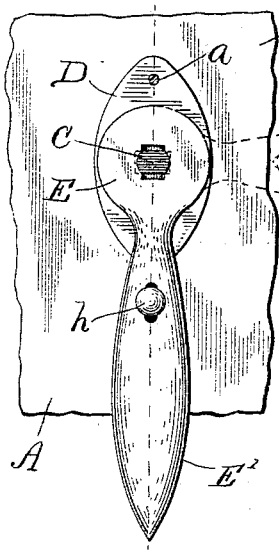
Figure 5:
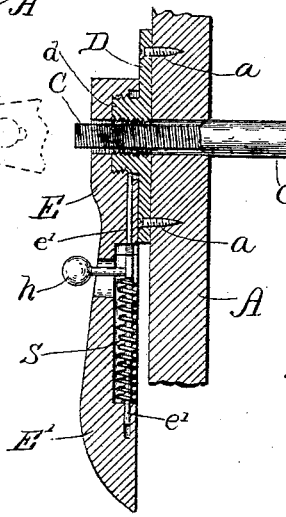
Figure 3:
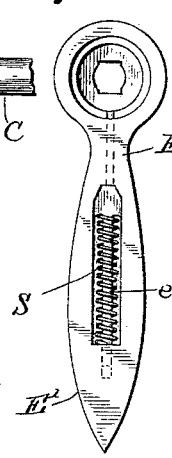
Figure 4:
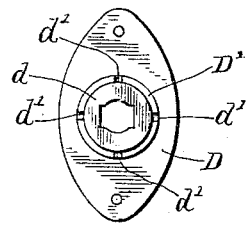
Figure 7:
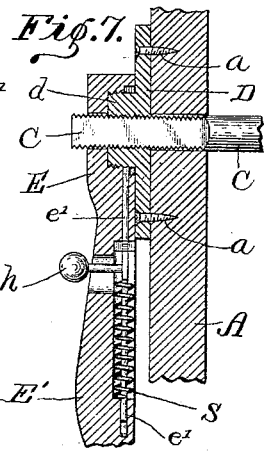
Figure 6:
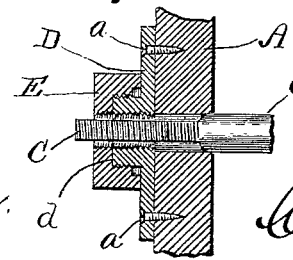

Referring to the accompanying drawings, which are made a part hereof and on which similar reference characters indicate similar parts, Figure 1 is a perspective view of a portion of a farm-wagon, showing the end-gate in position in the body thereof provided with a rod for holding such end-gate in place and its nut embodying my present invention; Fig. 2, an elevation, on an enlarged scale, of a fragment of the side of the wagon-body, showing the nut and the end of the rod; Fig. 3, an inside elevation of the movable part of the nut; Fig. 4, an elevation of the stationary part of the nut separately; Fig. 5, a central vertical sectional view through the parts when in the position shown by the full lines in Fig. 2 as seen from the dotted line 5 5 in said figure; Fig. 6, a view similar to Fig. 5 with the movable portion of the nut turned to the position indicated by the dotted lines in Fig. 2, and Fig 7 a view similar to Fig. 5 with the rod turned one-fourth around from the position shown in the other figures.

In said drawings the portions marked A represent the wagon-body; B, an end-gate in said wagon-body; C, the rod by which said end-gate is held in place; D, the stationary portion of the nut to said rod, and E the movable portion of said nut.

The wagon-body A and its end-gate B are or may be of the usual or any desired form. The rod C is also of a usual form except that at its threaded end two sides are flattened, so that at the flattened portions the threads are cut away, as is clearly shown by an examination of Figs. 5 and 7.

The stationary portion D of the nut is secured (preferably by screws $a$) to the wagon-body side, and so far as serving as a nut is concerned corresponds to an ordinary nut except that on two sides of its interior the threads are cut away, leaving only the two other sides threaded. Around the base of its central or hub portion $d$ is a rim D', and in this rim are four notches $d'$, with which the latch on the movable part E will engage, as will be presently explained.

The nut portion E has a perforation for the rod C of the same character as the perforation in the part D, so that when the parts are in registry with each other and the rod C is turned to the position shown in Fig. 6 said rod may be drawn freely through said nut as though no screw-threads were present. When, however, the part E is in the position shown in Figs. 5 and 7, the screw-threaded portions of the rod C are in engagement with either one or the other of the nut portions, and said rod is held thereby in the same manner as by an ordinary nut. To facilitate its turning, the nut portion E is provided with a handle E', and in order that it may conveniently be stopped and held at the proper points it is provided with a latch $e'$, which is adapted to engage with the notches $d'$ in the rim D' of the part D. This latch is provided with a handle $h$ and is normally held into engagement with the notches $d'$ by the spring S.

The operation may be described as follows: After the end-gate has been put into place the nut portions D and E are positioned as indicated in Fig. 6 and by the dotted lines in Fig. 2, and the rod C, turned to the position shown in Fig. 6, is inserted freely through the nut as far as it can conveniently be pushed. The nut portion E is then, by means of its handle E', turned to the position indicated by the full lines in Fig. 2, (shown also in Figs. 5 and 7,) and when in this position the devices constitute a complete nut, so that when the rod C is turned therein it will screw forward or backward exactly as with an ordinary nut. The nut part E is held in place in both its positions by means of its latch-bolt $e'$ engaging with the appropriate notch $d'$. The two parts of the nut are prevented from becoming separated by means of a screw-threaded formation where they come together, the central or hub portion of the nut D being exteriorly screw-threaded, while the cap-like portion of the nut E is similarly interiorly screw-threaded, so that the two parts fit together, as plainly shown in Figs. 5, 6, and 7.

Having thus fully described my said invention, what I claim as new, and desire to secure by Letters Patent, is—

1. The combination, with the rod C having a threaded end with flattened sides where the threads are cut away, of a nut composed of two parts and provided with screw-threaded perforations which are correspondingly cut away or flattened on opposite sides and adapted to be shifted in relation to each other, so that the rod may be moved freely through the same, or engage therewith after the manner of an ordinary nut, substantially as set forth.

2. The combination of a rod C having a threaded end with flattened sides, a nut portion D having a perforation therein corresponding in character to the end of the rod and provided with suitable engaging notches $d'$, and a nut portion E also having a perforation therein corresponding to the end of the rod and provided with a latch-bolt $e'$ adapted to engage with the notches in the part D and hold the parts to the proper relation with each other, substantially as set forth.

3. The combination of the wagon-body A, the end-gate B therein, the rod C adapted to pass through said wagon-body alongside said end-gate and hold the same in place, and a two-part nut one portion of which is fixedly secured to the side of the wagon-body and the other of which is adapted to be rotated in respect thereto, said rod and said nut portions each being threaded on two sides and flattened on the other sides, substantially as and for the purposes set forth.

In witness whereof I have hereunto set my hand and seal, at Logan, Kansas, this 17th day of October, A. D. 1898.

STEPHEN A. ROBINSON. [L. S.]

Witnesses:
THOMAS BROWN,
J. H. BOWMAN.